United States Patent [19]

Lechner et al.

[11] Patent Number: 4,782,322

[45] Date of Patent: Nov. 1, 1988

[54] AMPLITUDE MODULATION OF CONTROL SIGNALS OVER ELECTRICAL POWER LINES UTILIZING THE RESPONSE OF TUNING FORK FILTERS

[75] Inventors: Heinz Lechner, Renens; Jean-François Taillens, Sullens, both of Switzerland

[73] Assignee: Transec Financiere S.A., Luxembourg, Luxembourg

[21] Appl. No.: 32,975

[22] Filed: Mar. 26, 1987

Related U.S. Application Data

[63] Continuation of Ser. No. 444,573, filed as PCT CH82/00038, Mar. 15, 1982, published as WO82/03299, Sep. 30, 1982.

[30] Foreign Application Priority Data

Mar. 16, 1981 [CH] Switzerland ............... 1757/81

[51] Int. Cl.⁴ ............................................. H04M 11/04
[52] U.S. Cl. ........................... 340/310 A; 340/310 R; 340/310 CP; 455/3; 455/108; 375/80
[58] Field of Search ............... 307/3, 140; 340/310 R, 340/310 A, 310 CP; 455/3, 6, 42, 108–109; 375/80, 91; 333/1, 133, 200

[56] References Cited

U.S. PATENT DOCUMENTS

| 3,002,147 | 9/1961 | Wasserman | 340/310 A |
|---|---|---|---|
| 3,011,023 | 11/1961 | Billig | 375/91 |
| 3,239,769 | 3/1966 | Lee | 375/80 |
| 3,418,428 | 12/1968 | Cuvelier | 333/200 |
| 3,482,212 | 12/1969 | Marx | 340/825.69 |
| 3,519,847 | 7/1970 | Kienzle | 375/80 |
| 3,558,902 | 1/1971 | Casey | 340/310 CP |
| 3,588,719 | 6/1971 | Abramson | 333/200 |
| 3,659,280 | 4/1972 | Donohoo | 333/132 |
| 3,707,651 | 12/1972 | Lensner | 455/108 |
| 3,818,481 | 6/1974 | Dorfman | 340/310 CP |
| 3,891,926 | 6/1975 | Ishman | 455/108 |
| 4,034,305 | 7/1977 | Sato | 375/108 |
| 4,040,046 | 8/1977 | Long | 340/310 CP |
| 4,152,605 | 5/1979 | Coude | 340/310 A |
| 4,227,156 | 10/1980 | Mottfield | 333/133 |
| 4,290,144 | 9/1981 | Webb | 455/108 |
| 4,314,374 | 2/1982 | Kuhn | 455/108 |
| 4,390,863 | 6/1983 | Merkel | 340/310 R |

*Primary Examiner*—John W. Caldwell, Sr.
*Assistant Examiner*—Tyrone Queen

[57] ABSTRACT

An electrical signalling apparatus including a transmitter and receiver connected to the same electrical power distribution network wherein a signal generated by the transmitter is used to control apparatus connected to the receiver. The system uses a pair of amplitude-modulated low frequency signals as the control signals that react with the receiver to control apparatus connected thereto. The transmitter has an oscillator modulated by twin tuning forks and provides a signal for a period of, for example 10 seconds, determined by a time-delay relay. The receiver has a demodulator followed by two filters connected to integrators. As soon as the integrated signals reach a predetermined value, a control signal is transmitted to the output. This apparatus provides a communication system which is virtually insensitive to interferences on the distribution network and operates perfectly with weak signals.

3 Claims, 1 Drawing Sheet

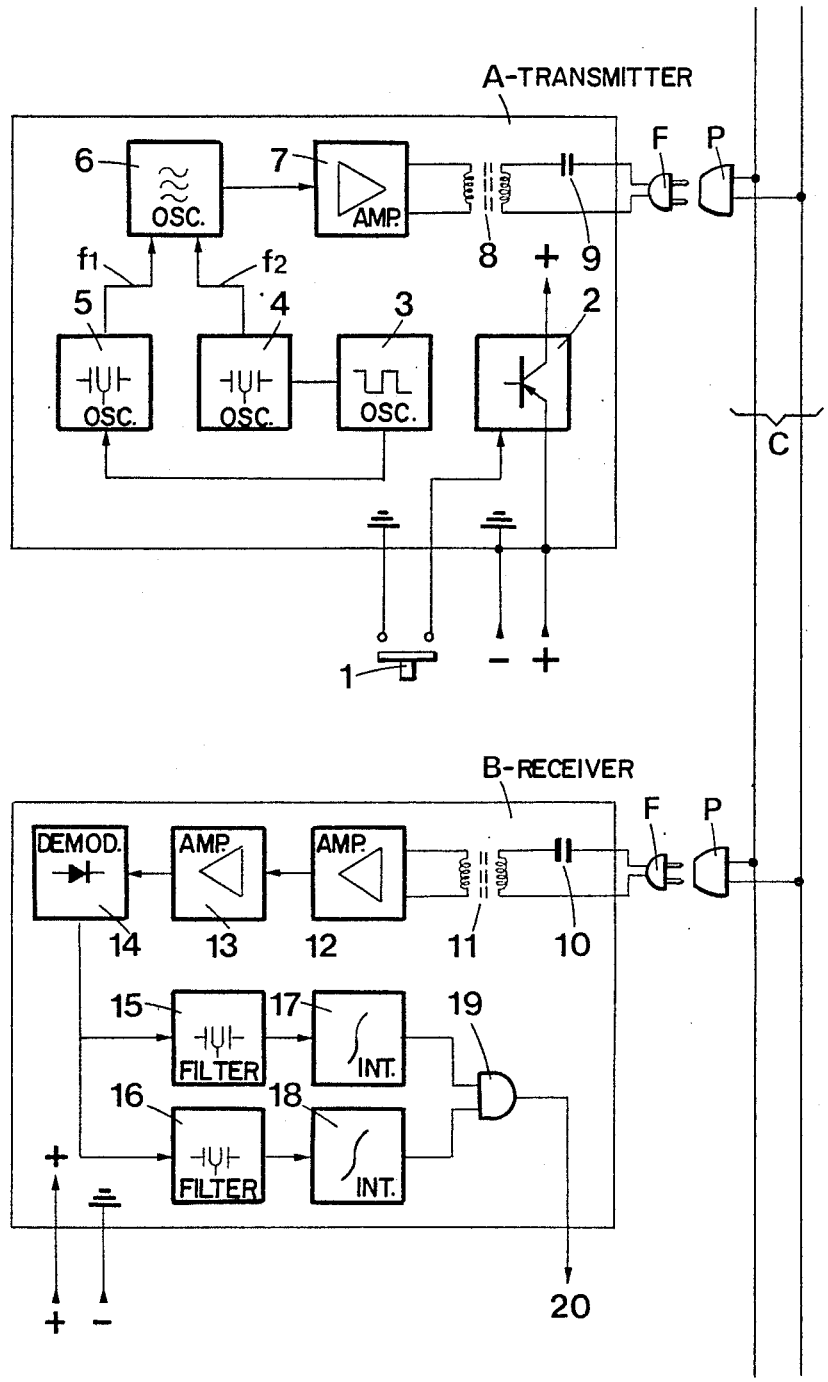

AMPLITUDE MODULATION OF CONTROL SIGNALS OVER ELECTRICAL POWER LINES UTILIZING THE RESPONSE OF TUNING FORK FILTERS

This is a continuation of application Ser. No. 06/444,573, filed as PCT CH82/00038 on Mar. 15, 1982, published as WO82/03299 on Sep. 30, 1982 (now abandoned.)

Electrical signalling apparatuses are known that comprise at least one transmitter and one receiver arranged to be connected to the same electrical mains network, the transmission from the transmitter to the receiver being effected by means of a wave transmitted by conductors of the said network, the transmitter comprising a carrier wave generator and a modulator of that wave, and the receiver comprising a circuit tuned to the frequency of the carrier, and a demodulator. The use of the electrical mains network has indisputable advantages from the point of view of positioning the apparatus and from the point of view of ease of adaption to the different arrangements of the components.

At the same time, the connection effected by means of the network avoids the need to provide, and the work of laying, electrical lines.

The network constitutes a line of communication having numerous drawbacks, however, particularly because of high voltage of the supply mains and above all because of the large amount of interference found on all electrical distribution networks.

The result is that a relatively high power must be given to the signals sent by the transmitter so that they can reach the receiver with a value that is distinctly higher than the receiver's threshold of sensitivity to interference.

In spite of this precaution, it may happen that the receiver reacts to interference without a signal having been transmitted by the transmitter.

The aim of the invention is to remedy these faults.

The invention has for its object an apparatus of the type mentioned above, characterised in that the transmitter comprises at least one modulating frequency generator and the receiver comprises a band pass filter connected to the output of the demodulator, and an integrator followed by an element that reacts as soon as the output signal of the integrator reaches a predetermined level.

The only FIGURE of the attached drawing shows diagramatically, and by way of example, an embodiment of the apparatus forming the subject of the invention.

The drawing shows the block diagram of a transmitter A and a receiver B which are connected to one another by means of two conductors belonging to a monophase alternating current supply mains.

The connection to this supply mains is by means of plugs F engaged in sockets P.

This arrangement allows the transmitter A to be placed anywhere where there is a supply socket and the receiver to be placed in a different position where a supply socket of the same mains is also available.

The transmitter A comprises a supply source not shown, that may be constituted by a dry cell or a rectifier supplied from the mains to which the component is attached.

It also comprises a contact 1 for setting the transmitter in operation to send a signal on the conductors C of the electrical mains network.

The actuation of the contact 1 renders conductive a delay circuit 2 which connects, for a specific period, for example from 5 to 10 seconds, the supply source to the various units that make up this transmitter.

These units consist principally of an oscillator 3 supplying a rectangular signal having a frequency of 1 Hz; this signal causes to operate in alternation two oscillators 4 and 5, the frequency of each of which is controlled by a tuning fork.

These two oscillators 4 and 5 are, of course, tuned to two different frequencies that may advantageously be between 1 and 5 kHz.

The output signals of the oscillators 4 and 5, having frequencies f1 and f2, are applied as modulating signals to an oscillator 6 generating a carrier frequency for example of the order of some tens of kHz.

The output of the oscillator 6 is amplitude modulated signal fs which is applied to power amplifier 7.

The output signal of the amplifier 7 is applied to the conductors C by means of a high-frequency transformer 8 and a capacitor 9 which must, of course, be able to withstand the peak voltage of the mains.

The filters 15 and 16 being tuning fork filters likewise constitute a mechanical integrator because excitation must last for a specific period before their output signal reaches the desired level to act on the electrical integrators 17 and 18.

In addition, the oscillator 3 causes the two tuning fork oscillators 4 and 5 to operate in alternation so that the modulation of the carrier wave is constituted by a succession of pure sonic frequencies, which allows the production of additional frequencies by beats to be avoided.

It is clear that the provision of two modulating frequencies greatly increases the operational reliability of the apparatus and reduces to a corresponding extent the risk of interference with other apparatus of the same type.

It is clear that, when apparatuses can be placed on a mains network that does not transmit many information signals, a single modulating frequency would be adequate, the receiver in that case being sensitive to that single frequency.

If, on the other hand, a number of apparatuses of this type had to be placed on the same network, it might be advantageous to provide more than two modulating frequencies.

However, as the receiver reacts only when there are two specific modulating frequencies present, it is possible to have a large number of different combinations of the said frequencies in order to obtain transmitter-receiver units that can operate independently of one another.

The receiver B likewise comprises a supply source of the same type as that of the transmitter A.

This receiver, which is connected to the mains by the plug F, receives the signal from the transmitter via a capacitor 10 and a high-frequency transformer 11.

These two elements constitute a high pass elementary filter greatly attenuating the mains frequency.

The signal received passes into two amplifiers 12 and 13 in succession, the first of which acts as a limiter and both of which are tuned to the carrier wave frequency.

After amplification, the signal passes to a demodulator 14 and the demodulated signal BF is applied to two tuning fork filters 15 and 16.

The output signals of these filters act on two integrators 17 and 18 to the outputs of which are connected to an AND gate 19.

The output signal of these gates can be used to actuate any type of device not shown, for example a luminous or acoustic alarm device or a control relay for a device of any type.

The apparatus described operates very reliably and its high insensitivity to interference voltages allows it to function with very weak signals, for example of the order of a few millivolts.

These advantages are due mainly to two integrators 17 and 18 which supply an output signal only when the modulation passing through the filters 15 and 16 has lasted for awhile.

The apparatus described has numerous possible uses. For example, the transmitter can be combined with a cell sensitive to infra-red rays so that it can be controlled by a person operating a portable transmitter that produces a call emission coded for infra-red rays.

Such a use is valuable especially for elderly or handicapped people who can thus alert another person living in the same building or nearby.

Of course, it is advantageous if the receiver is equipped with an optical or acoustic alarm device, this alarm remaining in operation when it has been actuated until the person who has been alerted returns it to the rest position.

It is clear that there are numerous other uses, for example the remote control of lighting in buildings and of the opening and closing of doors.

It is also possible to provide an alarm actuated by devices detecting fire, crime or smoke, or other anomalies.

Because of the high sensitivity of the apparatus it is, in principle, possible to place the transmitter and the receiver on different phases of the same network, the signal being transmitted from one phase to the other as a consequence of asymmetries in the network and also by capacitive and inductive coupling.

We claim:

1. An apparatus for transmitting signals over an existing power network comprising
   a transmitter (A) and a receiver (B) adapted to be connected to said network,
   a power source for each of said transmitter and said receiver,
   means (C) in said network for transmitting a modulated carrier wave from the transmitter to the receiver,
   said receiver (B) including amplifier means (12-13) tuned to the carrier wave frequency, filter means (15-16), demodulator means (14) between said amplifier means (12-13) and said filter means (15-16) whereby a demodulated signal is applied to said filter means (15-16), integrator means (17-18) receiving output signals from said filter means (15-16), and gate means (19) adapted to deliver output signals from said integrator means (17-18) to a responsive device when such signals reach a predetermined level,
   said transmitter (A) including oscillating means modulated by twin low frequency filtering means (4-5) whereby the carrier wave is amplitude modualted by two low frequency signals, and
   wherein said receiver filter means includes two band-pass filters tuned respectively to the two modulation frequencies, said band-pass filters being of the tuning fork type.

2. Apparatus according to claim 1 wherein said oscillating means includes a very low frequency oscillator alternatively controlling the modulation of the carrier wave by one and then the other of the two low frequency signals, the period of the very low frequency being shorter than the reaction time of the integrator means.

3. Apparatus according to claim 2 wherein said transmitter includes a time delay circuit to limit the duration of transmission, and contact means connecting the time delay circuit to the power source to energize said transmitter for a predetermined time.

* * * * *